United States Patent
Agranonik et al.

(10) Patent No.: US 10,419,449 B1
(45) Date of Patent: Sep. 17, 2019

(54) AGGREGATING NETWORK SESSIONS INTO META-SESSIONS FOR RANKING AND CLASSIFICATION

(71) Applicant: EMC IP Holding Company LLC, Hopkinton, MA (US)

(72) Inventors: Arie Agranonik, Herzliya (IL); Erik Heuser, Manassas, VA (US)

(73) Assignee: EMC IP Holding Company LLC, Hopkinton, MA (US)

(*) Notice: Subject to any disclaimer, the term of this patent is extended or adjusted under 35 U.S.C. 154(b) by 77 days.

(21) Appl. No.: 15/802,576

(22) Filed: Nov. 3, 2017

(51) Int. Cl.
*H04L 29/06* (2006.01)

(52) U.S. Cl.
CPC .......... *H04L 63/14* (2013.01); *H04L 63/1408* (2013.01); *H04L 63/1425* (2013.01); *H04L 63/1441* (2013.01); *H04L 63/20* (2013.01)

(58) Field of Classification Search
CPC ..... H04L 63/10; H04L 63/14; H04L 63/1408; H04L 63/1416; H04L 63/1425; H04L 63/1441; H04L 63/145; H04L 63/1458; H04L 63/1466; H04L 63/1475; H04L 63/20

See application file for complete search history.

(56) References Cited

U.S. PATENT DOCUMENTS

2011/0055921 A1* 3/2011 Narayanaswamy ............ H04L 63/1458
726/22

OTHER PUBLICATIONS mathworld.wolfram.com, "Exponential Decay," http://mathworld.wolfram.com/ExponentialDecay.html, Oct. 30, 2017, 1 page.
makarandtapaswi.wordpress.com, "The Technical Experience Page—Intuition Behind Average Precision and Map," https://makarandtapaswi.wordpress.com/2012/07/02/intuition-behind-average-precision-and-map/, Jul. 2, 2012, 8 pages.

* cited by examiner

*Primary Examiner* — Edward Zee
(74) *Attorney, Agent, or Firm* — Ryan, Mason & Lewis, LLP

(57) ABSTRACT

A method includes obtaining session data related to a plurality of network sessions, analyzing the session data to identify one or more features of the network sessions, and utilizing the one or more features to aggregate the plurality of network sessions into a plurality of meta-sessions. A meta-session comprises a set of network sessions having similar features. The method also includes selecting a classifier for ranking the meta-sessions based on a scoring function that characterizes performance in ranking meta-sessions having a designated characteristic, ranking the meta-sessions utilizing the selected classifier, providing a designated number of the ranked meta-sessions for additional processing to determine potential maliciousness, and modifying access by client devices to an additional network session responsive to the additional network session comprising session data with features similar to those of one of the designated number of the ranked meta-sessions determined to be potentially malicious.

20 Claims, 7 Drawing Sheets

Before sorting:
r1 [0.96 0.95 0.98 0.99]
True label: [0 1 0 1 1]

r2 [0.67 0.68 0.94 0.95 0.99]
True label: [1 0 0 1 1]

After sorting:
r1 [0.95 0.96 0.96 0.98 0.99] [0 0 1 1 1]
r2 [0.67 0.68 0.94 0.95 0.99] [1 0 0 1 1]

Mean precision r1: [1 1 1 0.75 0.6]
Mean precision r2: [1 1 0.6666667 0.5 0.6]

Exponential decay vector with $\lambda = -.1$
[0.90483742 0.818873075 0.74081822 0.67032005 0.60653066]

Score r1: 3.08410541526
Score r2: 2.91652540375

FIG. 5

AGGREGATING NETWORK SESSIONS INTO META-SESSIONS FOR RANKING AND CLASSIFICATION

FIELD

The field relates generally to security, and more particularly to detection of security threats.

BACKGROUND

Various entities are subject to different types of security threats. Some security threats relate to networking and computer security for client devices used by members of an entity, such as a business, organization or other enterprise. Malware is an example of such a security threat. Malware can pose a threat to an individual user and that user's devices, as well as possibly threatening an entity associated with the user. Users or members of an entity can become victims of malware-based attacks through a plethora of different infection vectors including through malicious or potentially malicious network sessions.

SUMMARY

Illustrative embodiments of the present invention provide techniques for the classification and ranking of network sessions, including potentially malicious network sessions. Such techniques in some embodiments advantageously permit for classification of unknown network sessions more efficiently, as the ranking of network sessions permits limited resources to be used more effectively in analyzing unknown network sessions with higher risk of maliciousness. Accordingly, a network security system used in classification of network sessions can exhibit improved performance as well as enhanced security against attacks.

In one embodiment, a method comprises obtaining session data related to a plurality of network sessions, a given one of the network sessions being associated with a set of two or more of a plurality of client devices. The method also comprises analyzing the session data to identify one or more features of respective ones of the plurality of network sessions and utilizing the one or more features to aggregate the plurality of network sessions into a plurality of meta-sessions, a given one of the meta-sessions comprising a set of two or more of the plurality of network sessions having features exhibiting at least a threshold level of similarity. The method further comprises selecting a classifier for ranking the meta-sessions based on a scoring function that characterizes performance of the classifier in ranking meta-sessions having at least one designated characteristic, ranking the meta-sessions utilizing the selected classifier, and providing a designated number of the ranked meta-sessions for additional processing to determine whether respective ones of the meta-sessions in the designated number of the ranked meta-sessions are potentially malicious. The method further comprises modifying access by the plurality of client devices to an additional network session responsive to the additional network session comprising session data with one or more features exhibiting at least the threshold level of similarity to one of the meta-sessions in the designated number of the ranked meta-sessions determined to be potentially malicious. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

BRIEF DESCRIPTION OF THE DRAWINGS

FIG. 5 shows an example of classifier ranking in an illustrative embodiment.

DETAILED DESCRIPTION

Figure 1:
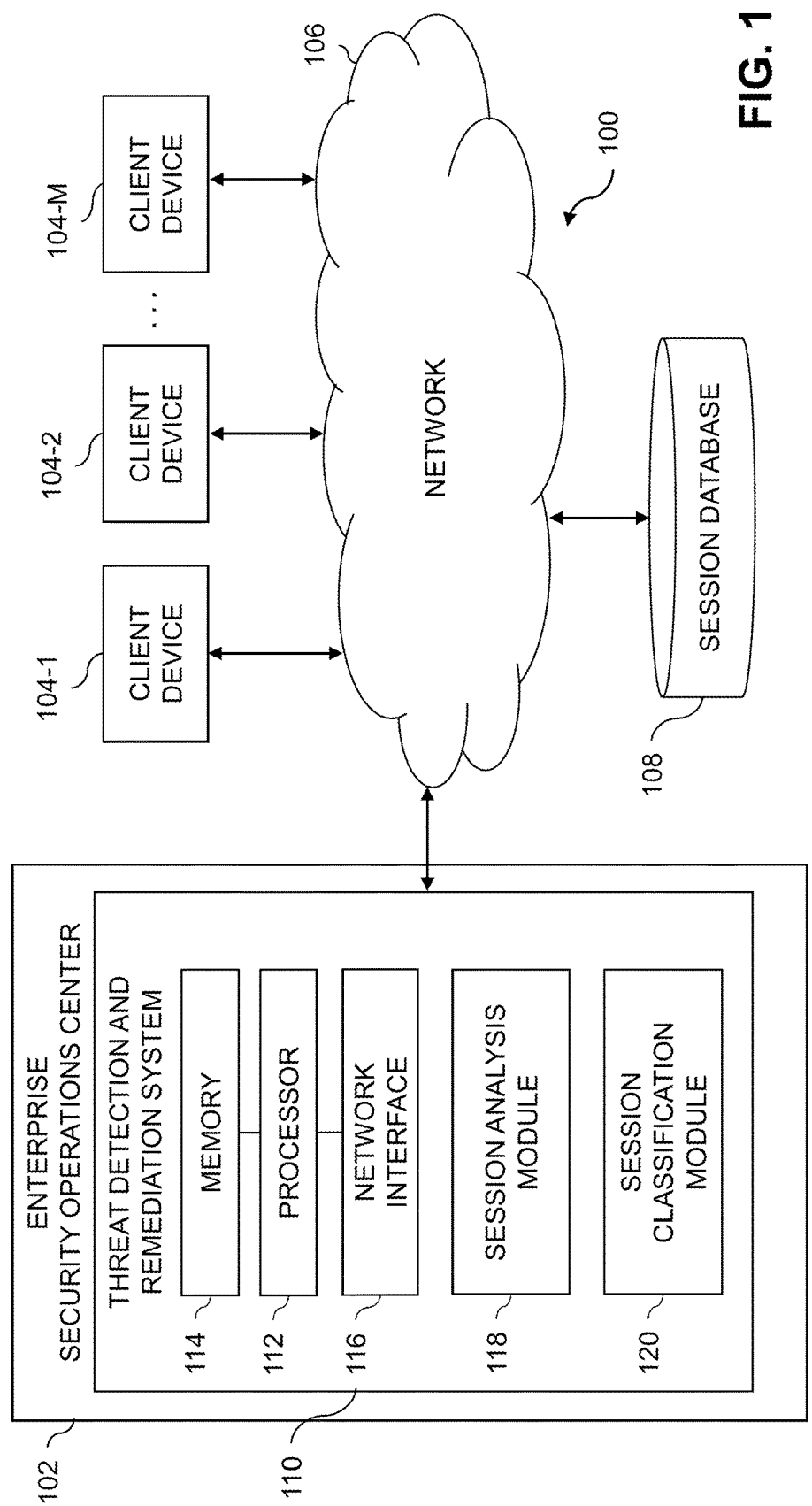
FIG. 1 is a block diagram of an information processing system for classifying network sessions in an illustrative embodiment of the invention.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Network session classification may use various approaches. In a manual approach, which may be used by an analytics department of a critical incident response center (CIRC), a query-based approach is used after a main indicator tool is used for creating indicators of compromise (IOCs). The manual approach includes executing structured query language (SQL) queries by analysts. The analysts look for known patterns of malware and try to identify malicious activity. This "divide and conquer" approach is error prone and work intensive, and can lead to many false positives and false negatives.

Automatic models for network session classification identify malicious network sessions dynamically. Such approaches include an alerting system that uses features to detect malicious network sessions and perform active reporting. Normally, systems which utilize automatic models have no access to full sessions, and are thus based on raw features and simple indicators. Further, the automatic model is typically trained once and then deployed into production. In contrast, embodiments herein are configured to base classification and ranking models on multiple features, including session features, service features and raw IOCs. In addition, since embodiments access an entire session in history and use a combination of the information from multiple sources, predictive power is higher.

The above-described approaches deal with classification, rather than risk ordering. Such approaches attempt to classify network sessions as good or bad, which can be problematic as the decision boundary of classification may change over time. Instead of simple classification, some embodiments utilize classifiers in an initial round of processing to assign risk scores to meta-sessions, and then rank the meta-sessions. A subset of the ranked meta-sessions most likely to be malicious are then provided for additional processing to let analysts work on meta-sessions that present the most risk. Thus, embodiments, allow for classifiers to be used as a guide while leaving decision making power to analysts, which may be more sophisticated than the classifier used in ranking.

FIG. 1 shows an information processing system 100 configured in accordance with an illustrative embodiment of the invention. The information processing system 100 comprises an enterprise security operations center (SOC) 102 and a plurality of client devices 104-1, 104-2, . . . 104-M, collectively referred to herein as client devices 104. The client devices 104 are coupled to a network 106. Also coupled to the network 106 is a session database 108, which may store information relating to network sessions, including previously classified or known network sessions.

The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the information processing system 100 and network 106 may also be referred to herein as collectively comprising an "enterprise network." Numerous other operating scenarios involving a wide variety of different types and arrangements of processing devices and networks are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks. The network 106 in some embodiments therefore comprises combinations of multiple different types of networks each comprising processing devices configured to communicate using Internet Protocol (IP) or other related communication protocols.

The session database 108, as discussed above, is configured to store and record information relating to network sessions, including information related to previously classified network sessions. The session database 108 may, in some embodiments, more particularly store information relating to IOCs for network sessions, service analysis indicators or features, session analysis indicators or features, etc. The session database 108 may also store information relating to network sessions before such network sessions are ranked or classified, or may store information relating to known or previously classified network sessions. In some cases, information in the session database 108 may include a blacklist of known malicious or potentially malicious network sessions or other information characterizing known malicious or potentially malicious network sessions such as previous patterns of attack used by known malicious or potentially malicious network sessions. The session database 108 may also or alternatively store a whitelist of known benign previously classified network sessions, or information associated with known benign network sessions.

The session database 108 in some embodiments is implemented using one or more storage devices associated with the enterprise SOC 102. Such storage devices may comprise, for example, storage products such as VNX® and Symmetrix VMAX®, both commercially available from Dell EMC Corporation of Hopkinton, Mass. A variety of other storage products may be utilized to implement at least a portion of the storage devices associated with the enterprise SOC 102.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

In the present embodiment, alerts or notifications generated by a threat detection and remediation system 110 of the enterprise SOC 102 are provided over network 106 to client devices 104, or to a system administrator, information technology (IT) manager, or other authorized personnel via one or more security agents. Such security agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 110. For example, a given security agent may comprise a mobile telephone equipped with a mobile application configured to receive alerts from the enterprise SOC 102 or the threat detection and remediation system 110 and to provide an interface for the security agent to select particular remedial measures for responding to the alert or notification. Examples of such remedial measures may include blocking client devices 104 from joining potentially malicious network sessions, terminating potentially malicious network sessions, requiring client devices 104 to join potentially malicious network sessions in a sandboxed or other protected environment on one or more of the client devices 104, requiring user input or authentication to participate in potentially malicious network sessions, etc.

It should be noted that a "security agent" as the term is generally used herein may comprise an automated entity, such as a software entity running on a processing device. Accordingly, a security agent need not be a human entity.

As shown in FIG. 1, the enterprise SOC 102 comprises threat detection and remediation system 110. As will be described in further detail below, the threat detection and remediation system 110 is configured to classify network sessions, including potentially malicious network sessions.

Although shown as an element of the enterprise SOC 102 in this embodiment, the threat detection and remediation system 110 in other embodiments can be implemented at least in part externally to the enterprise SOC 102, for example, as a stand-alone server, set of servers or other type of system coupled to the network 106. In some embodiments, the threat detection and remediation system 110 may be implemented at least in part within one or more of the client devices 104.

FIG. 1, which shows the threat detection and remediation system 110 as part of the SOC 102 of an enterprise, illustrates an example implementation of a network inspection tool that operates on the enterprise level and that inspects the network 106 for anomalous activity. In some embodiments, the threat detection and remediation system 110 may operate as a subscription service, including as part of a cloud computing or other processing platform, which may be used by different enterprises for monitoring network activity by that enterprise's client devices.

The threat detection and remediation system 110 may also be embodied as a malicious session ranking tool, deployed in the network 106 which provides a worklist for analysts that inspect network sessions or meta-sessions that have high scores. The malicious session ranking tool can help an incident response team associated with an enterprise to hunt for malicious traffic on the network 106 by prioritizing which sessions to look for.

The threat detection and remediation system 110 in other embodiments may be implemented as an endpoint monitoring tool, such as on one of the client devices 104, to look at network activity on that client device. The endpoint tool could send alerts to the SOC 102, a network administrator, etc., when malicious network sessions are identified.

The threat detection and remediation system 110 in the FIG. 1 embodiment is assumed to be implemented using at least one processing device. Each such processing device generally comprises at least one processor and an associated memory, and implements one or more functional modules for controlling certain features of the threat detection and remediation system 110.

More particularly, the threat detection and remediation system 110 in this embodiment comprises a processor 112 coupled to a memory 114 and a network interface 116.

The processor 112 illustratively comprises a microprocessor, a microcontroller, an application-specific integrated circuit (ASIC), a field-programmable gate array (FPGA) or other type of processing circuitry, as well as portions or combinations of such circuitry elements.

The memory 114 illustratively comprises random access memory (RAM), read-only memory (ROM) or other types of memory, in any combination. The memory 114 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 116 allows the threat detection and remediation system 110 to communicate over the network 106 with the client devices 104, and illustratively comprises one or more conventional transceivers.

The processor 112 further comprises a session analysis module 118 and a session classification module 120. The session analysis module 118 is configured to obtain session data related to a plurality of network sessions. Each of the network sessions may be associated with a set of two or more of the client devices 104. Different ones of the plurality of network sessions may be associated with different sets of two or more of the client devices 104. In some cases, multiple ones of the plurality of network sessions may be associated with a same set of two or more of the client devices 104.

The session analysis module 118 is further configured to analyze the session data to identify one or more features of respective ones of the plurality of network sessions, and to utilize the one or more features to aggregate the plurality of network sessions into a plurality of meta-sessions. Each of the meta-sessions may comprise a set of two or more of the plurality of network sessions that have features exhibiting at least a threshold level of similarity. In some cases, the threshold level of similarity may be that each of the network sessions in a given meta-session is between the same pair of client devices 104, that each of the network sessions in the given meta-session originates at a particular one of the client devices 104, that each of the network sessions in the given meta-session utilizes a same network protocol, etc., including combinations of the above and other features. In some cases, the given meta-session aggregates network sessions that take place over some defined time period (e.g., all network sessions exhibiting the threshold level of similarity in a given hour, day, week, etc.).

The session classification module 120 is configured to select a classifier for ranking the meta-sessions based on a scoring function that characterizes performance of the classifier in ranking meta-sessions having at least one designated characteristic. The session classification module 120, for example, may select from amongst a group of two or more different classifiers based on the ability of such classifiers to rank meta-sessions based on their potential maliciousness (e.g., an ability to place meta-sessions that are likely to be classified as malicious or potentially malicious near a top of an ordered list of the meta-sessions). The session classification module 120 is further configured to rank the meta-sessions utilizing the selected classifier, and to provide a designated number of the ranked meta-sessions for additional processing to determine whether respective ones of the meta-sessions in the designated number of the ranked meta-sessions are potentially malicious. In some cases, the designated number of the ranked meta-sessions are provided to analysts for classification as benign or potentially malicious.

The term "analyst" as used herein is intended to be broadly construed. For example, an analyst may include a third party (e.g., an external classification system such as a third-party analysis service), an expert human analyst, etc. The term analyst as used herein more generally includes any entity configured to perform additional processing of the designated number of the ranked meta-sessions to determine whether respective ones of the designated number of the ranked meta-sessions have some designated characteristic, such as determining whether such meta-sessions are in fact malicious or potentially malicious.

In various situations, it is advantageous to reduce or otherwise focus analyst time and resources on a limited number of meta-sessions. In the case of an analyst implemented as a third-party analysis service, the third-party analysis service may charge by number of meta-sessions to be analyzed, and thus it is desired to reduce the overall number of meta-sessions that are provided to the third-party analysis service. In the case of an expert human analyst, the expert human analyst may have limited capacity (e.g., based on hours in a working day) that are available for determining whether meta-sessions are potentially malicious.

As a result of the additional processing, certain ones of the designated number of the ranked meta-sessions may be determined to be potentially malicious. The threat detection and remediation system 110 thereafter modifies access by the client devices 104 to additional network sessions responsive to the additional network sessions having session data with features that match one or more of the meta-sessions determined to be potentially malicious.

Additional details regarding the session analysis module 118 and session classification module 120 will be described in further detail below with respect to FIGS. 2-7.

It is to be appreciated that the particular arrangement of the enterprise SOC 102, threat detection and remediation system 110, session analysis module 118 and session classification module 120 illustrated in the FIG. 1 embodiment is presented by way of example only, and alternative arrangements can be used in other embodiments. As discussed above, for example, the enterprise SOC 102, threat detection and remediation system 110, session analysis module 118 and/or session classification module 120 may in some embodiments be implemented internal to one or more of the client devices 104. As another example, the functionality associated with the session analysis module 118 and session classification module 120 may be combined into one module, or separated across more than two modules with the multiple modules possibly being implemented with multiple distinct processors.

At least portions of the session analysis module 118 and the session classification module 120 may be implemented at least in part in the form of software that is stored in memory 114 and executed by processor 112.

It is to be understood that the particular set of elements shown in FIG. 1 for classification of network sessions is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 110 may be implemented external to enterprise SOC 102, such that the enterprise SOC 102 can be eliminated.

In some embodiments, the threat detection and remediation system 110 may be part of or otherwise associated with a system other than the enterprise SOC 102, such as, for example, a CIRC.

Additionally or alternatively, the threat detection and remediation system 110 can be part of or incorporate an otherwise conventional security analytics system, such as the RSA Security Analytics system commercially available from RSA, The Security Division of Dell EMC.

Other embodiments can implement the threat detection and remediation system 110 as part of or in conjunction with a security information and event management (STEM) system, such as the enVision® platform, also commercially available from RSA.

SOCs, CIRCs, security analytics systems and STEM systems are all examples of "network security systems" as that term is broadly used herein.

The threat detection and remediation system 110 may be implemented at least in part using one or more processing platforms including public or private cloud infrastructure, or other distributed virtual infrastructure. Such a distributed virtual infrastructure may comprise, by way of example, a hypervisor platform and associated virtual processing and storage elements. An example of a commercially available hypervisor platform suitable for use in some embodiments is VMware® vSphere® which may have an associated virtual infrastructure management system such as the VMware® vCenter™.

Other processing platforms may be used to implement threat detection and remediation system 110 in other embodiments, such as different types of virtualization infrastructure in place of or in addition to virtualization infrastructure comprising virtual machines. Such virtualization infrastructure illustratively includes container-based virtualization infrastructure configured to provide Docker containers or other types of Linux containers (LXCs).

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

An exemplary process for classification of network sessions will now be described in more detail with reference to the flow diagram of FIG. 2. It is to be understood that this particular process is only an example, and that additional or alternative processes for classification of network sessions can be carried out in other embodiments.

In this embodiment, the process includes steps 200 through 212. These steps are assumed to be performed by the processor 112 of the threat detection and remediation system 110 utilizing session analysis module 118 and session classification module 120. The process begins with step 200, obtaining session data related to a plurality of network sessions.

In step 202, the session data is analyzed to identify one or more features of respective ones of the plurality of network sessions. In some embodiments, the features comprise IOCs, such as malware signatures, IP addresses or IP domains associated with known potentially malicious network sessions, etc. The features may also or alternatively comprise technical indicators associated, for example, with network protocols of respective ones of the plurality of network sessions. Such technical indicators may include direct communications with an IP address rather than an IP domain in a host header, hypertext transfer protocol (HTTP) POST requests without referrer headers, HTTP post requests in a given network session that does not utilize one or more other types of HTTP requests, etc. It is to be appreciated that embodiments are not limited solely to use in analyzing network sessions which utilize the HTTP protocol. Network sessions may utilize requests of various different protocols including but not limited to Doman Name System (DNS), HTTP, HTTP Secure (HTTPS), Internet Control Message Protocol (ICMP), etc. A given network session may also utilize requests, methods or commands of multiple different protocols including combinations of the above-mentioned and other protocols.

The features may further or alternatively comprise session analysis features, such as features relating to connections that are originated from a first one of the client devices 104 within a designated portion of network 106 to a second one of the client devices 104 that is outside the designated portion of network 106, connections that are originated from the second one of the client devices 104 outside the designated portion of the network to the first one of the client devices 104 within the designated portion of the network, entropy for payload streams of network sessions, a ratio of send versus receive data for network sessions, etc. It is to be appreciated that the specific features described above are presented by way of example only, and that various other types of features may be used in addition to or in place of one or more of the above-described features.

The features are utilized in step 204 to aggregate the plurality of network sessions into a plurality of meta-sessions. Meta-sessions, as discussed above, may comprise a set of two or more network sessions having features that exhibit at least a threshold level of similarity. In some embodiments, the meta-sessions comprise two or more network sessions utilizing a same session protocol between a first one of the plurality of client devices and a second one of the plurality of client devices over a designated time period.

The process continues with step 206, selecting a classifier for ranking the meta-sessions based on a scoring function that characterizes performance of the classifier in ranking meta-sessions having at least one designated characteristic. In some embodiments, the designated characteristic is potential maliciousness, such that the classifier is selected based on how well the classifier is able to sort or rank meta-sessions based on risk of maliciousness. It is to be appreciated that over time, the performance of different classifiers may vary. For example, different classifiers may be associated with different machine learning networks, whose performance may vary as additional feedback or training data is provided. Initially, a first classifier may have a higher score according to the scoring function relative to a second classifier. At a later date, after feedback and additional training, the second classifier may have a higher score according to the scoring function relative to the first classifier. Step 206 may be repeated periodically such that the classifier selected for use in ranking meta-sessions is updated. Thus, step 206 may involve selecting a classifier for use for a designated period of time (e.g., one week, one month, etc.) and then re-evaluating available classifiers at the expiration of the designated period of time.

In step 208, the meta-sessions are ranked utilizing the selected classifier. Step 208 in some embodiments includes generating a list of the meta-sessions ordered based on risk of potential maliciousness. The scoring function may characterize the performance of the classifier in ranking meta-sessions that are potentially malicious at a top of the ordered list of the meta-sessions. Entries in an ordered list may be sorted by a designated characteristic, such as potential maliciousness. Depending on the sorting, the results most likely to be malicious may be at a beginning or end of the list. The phrase "top of an ordered list" as used herein refers to the portion of the list with entries that are more likely to have the designated characteristic. If a list sorts entries in ascending order of the designated characteristic, the "top" of the ordered list is the later entries in that list. If a list sorts entries in descending order of the designated characteristic, the "top" of the ordered list is the beginning entries in that list.

In some embodiments, the scoring function utilizes an exponential decay parameter, the exponential decay parameter assigning importance to the meta-sessions based on respective positions of the meta-sessions in an ordered list of the meta-sessions. The exponential decay parameter gives higher weight to a first x meta-sessions in the ordered list of the meta-sessions and exponentially lower weights to meta-sessions after the first x meta-sessions in the ordered list of the meta-sessions.

The scoring function may utilize a precision parameter, the precision parameter characterizing an average precision at a designated position in an ordered list of the meta-sessions. The designated position may be selected based on resources available for determining whether respective ones of the meta-sessions in the designated number of the ranked meta-sessions are potentially malicious. As the resources available change over time, the designated position may be adjusted.

After ranking in step 208, a designated number of the ranked meta-sessions is provided in step 210 for additional processing to determine whether respective ones of the meta-sessions in the designated number of the ranked meta-sessions are potentially malicious. In some cases, the designated number of the ranked meta-sessions are provided to analysts for classification as benign or potentially malicious. Providing the designated number of the ranked meta-sessions to analysts may involve providing the designated number of the ranked meta-sessions to an analyst. As mentioned above, the term analyst should be broadly construed to include any entity configured to perform additional processing to determine whether respective ones of the meta-sessions in the designated number of the ranked meta-sessions have some designated characteristic, such as potential maliciousness. Examples of analysts include but are not limited to expert human analysts, third party analysis services, etc.

As a result of the additional processing, certain ones of the designated number of the ranked meta-sessions may be determined to be potentially malicious. In step 212, access by the client devices 104 to an additional network session is modified responsive to determining that the additional network session comprises session data with one or more features exhibiting at least the threshold level of similarity to one of the meta-sessions in the designated number of the ranked meta-sessions determined to be potentially malicious.

Modifying access by the client devices 104 to the additional network session, in some embodiments, comprises terminating the additional network session, or preventing one or more of the client devices 104 from joining the additional network session. Modifying access in step 212 may alternatively or further comprise causing a given one of the client devices 104 to join the additional network session in a sandboxed application environment on the given client device.

Modifying access in step 212 may further or alternatively include generating one or more notifications or alerts to send to one or more of the client devices 104, to one or more network administrators or IT professionals associated with the enterprise, etc. Transmitting the alert or other notification to the client device may utilize one or more APIs of a client device permitting remedial or preventative actions to be taken, such as terminating the additional network sessions, causing a pop-up, icon or other warning to be displayed on a screen of the client device warning the user of the potentially malicious nature of the additional network session, etc. Transmitting the alert or other notification to the network administrator or IT professional can allow such users to grant or deny access by the client device to the additional network session, possibly after further review or analysis of the additional network session.

Figure 2:
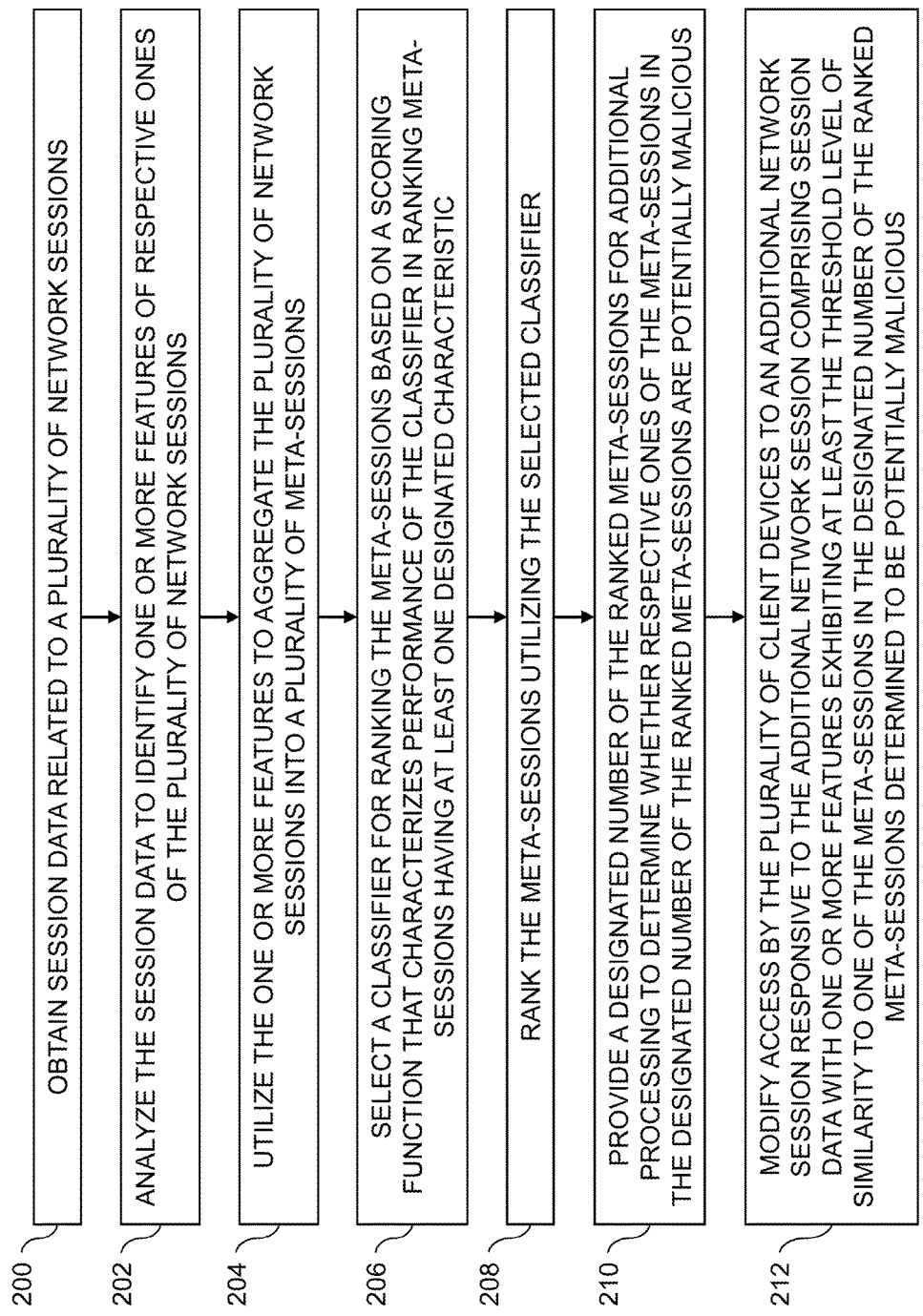
FIG. 2 is a flow diagram of an exemplary process for classifying network sessions in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving network session analysis and classification. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different network session classification algorithms, such as for respectively pluralities of network sessions that are associated with different groups of client devices 104 (e.g., client devices of different enterprises), for ranking meta-sessions according to different designated characteristics (e.g., for different types of maliciousness), etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Network session analysis is a field of computer or network security which specializes in identifying malicious communications in an enterprise network. Network session analysis involves looking at metadata indicative of anomalous or suspicious activity. For example, a machine or client device which is compromised may periodically beacon an entity outside, for example, an enterprise network. Each example of such beaconing is a network session. Repeated network sessions involving beacons to outside entities may be arranged into a meta-session as described herein. Such a meta-session may represent potentially malicious activity that the enterprise would like to detect.

In illustrative embodiments, systems for identifying and ranking network sessions by their risk of being malicious are provided. The risk of maliciousness is determined based on network activity features that are extracted, derived or otherwise determined from session data. The session data and/or the network activity features may be generated from a network-aware tool configured to monitor network sessions of the client devices of an enterprise (e.g., client devices 104 communicating over network 106).

Algorithms are provided which aggregate session data for multiple network sessions into meta-sessions, which may be grouped by time periods. Filtering is performed on the meta-sessions, such as based on service activity. After filtering, an estimate of the level of maliciousness is determined, and the meta-sessions are ranked. As an end result, tools are made available to security analysts which enable rapid investigation into the riskiest network sessions (or meta-sessions) that are discovered in an enterprise during a given time frame (e.g., a most recent time frame). This allows for more effective analysis and investigation into potential network attacks and malware detection.

Some embodiments utilize metrics for evaluating the performance of different classifiers in ranking meta-sessions. Such metrics include an average precision that is coupled with exponential decay, which incentivizes a cost function to bring the riskiest meta-sessions to the top of an investigation list thereby enabling analysts to handle the riskiest meta-sessions first. Scoring functions for evaluating the performance of different classifiers in ranking meta-sessions by some designated characteristic such as potential maliciousness provide a number of advantages to achieve various goals. One goal is to incentivize high precision at the top of an ordered list of the meta-sessions. This enables limited resources of analysts to be focused on relevant meta-sessions at the top, rather than choosing meta-sessions randomly after crossing some threshold risk level. The result of such ranking is increased return on investment (ROI) for analyst time or resources.

The use of exponential decay furthers another goal as it allows for controlling the workload capacity of an analyst by giving higher weight to a first x meta-sessions with highest scores and lowering the score exponentially when the capacity x is reached. The parameter x can be controlled to make a model that learns an optimal "x" per analyst, according to prior performance of that analyst (e.g., an average number of tickets solved during a working day). The x parameter for a given analyst may increase with time as the analyst become more effective. It is to be appreciated the multiple analysts may be used, with each analyst having its own associated x parameter.

As malware attacks are becoming more frequent, multiple defenses may be necessary to address the cyber kill chain. This leads to both network analysis and other endpoint tools common in various enterprises. Typical signature-based solutions cannot address the rapidly evolving threat landscape. Looking for known malicious files, domains or IP addresses may represent a losing endeavor for defenders, as the effort required to identify these components may be too high considering that an attacker can easily change a malware signature or move to a new domain or IP for command and control. Moreover, with the recent growth in living-off-the-land attacks, adversaries can use components that are built into the operating system of client devices to achieve their goals without requiring any malware to be placed on the client devices.

Illustrative embodiments overcome these and other disadvantages by identifying and classifying threats at a higher level (e.g., network sessions). Malicious behavior may be determined based on patterns of activity or other features that are determined at the network session level, rather than focusing on specific artifacts used in a particular attack. Embodiments may utilize a network inspection tool which aggregates packets by session. In some embodiments, a network session is a communication over time between a designated set of two or more client devices. In the description below, it is assumed that each session is defined as an IP pair communication over time that utilizes some protocol (also referred to herein as a service) such as HTTP. Preprocessing is performed on session data to identify various features or indicators, which are later used (e.g., in a classifier such as a machine learning network) to evaluate risk.

Indicators or features of session data may be organized into various categories from a behavioral viewpoint. Individual features or indicators may not be strong indicators of malicious activity, and many features or indicators can be triggered or raised on benign, easily-explainable behavior. Combinations of features or indicators as well as the ordering of such features or indicators, however, may help to identify suspicious or potentially malicious behavior. Described below are three high level categories of network activity features which may be used in some embodiments. It is to be appreciated, however, that embodiments are not limited to use with the specific features or categories of features described below. Instead, embodiments may more generally use various other types of features which may be extracted, derived or otherwise determined from session data.

IOCs represent a first high level category of features of network activity. Possible intrusions into an enterprise network may be identified through malware signatures, IPs or domains that are associated with known command and control campaigns or attacks, etc. IOC features may be triggered on detection of a threshold number of such malware signatures, IPs or domains (e.g., when a metadata key is populated with at least one known or suspected malware signature or IP or domain associated with a known command and control campaign). IOCs may also include "looser" signatures which do not require detection of a known malware signature or an IP address or domain associated with a known command and control campaign. IOCs, for example, may include detection of HTTP POST methods, single character PHP scripts, unrecognized protocols with a mainly binary handshake, unrecognized protocols with high entropy in request and response streams, etc.

Service analysis represents another high level category of features of network activity. Service analysis features may include technical indicators that are based on the parsed protocol of a given network session. Thus, service analysis features in some embodiments are extracted or identified based on identification and inspection of core application protocols utilized by network sessions. Examples of such technical indicators include HTTP sessions that directly communicate with an IP not a domain in a host header, HTTP POST methods without a referrer header, HTTP post sessions (e.g., in HTTP/1.1) that do not include other HTTP methods, etc.

Session analysis represents another high level category of features of network activity. Session analysis may utilize a large inspection library that highlights file characteristics and anomalies. Session analysis features represent technical aspects of individual network sessions, with concepts such as directionality, entropy, etc. Directionality features, for example, may characterize whether a network session involves a connection that originates at a client device within an enterprise to a destination that is outside the enterprise or vice-versa, as well lateral communications or connections between client devices within an enterprise. Entropy features may characterize payload streams of network sessions, including attributes such as the ratio of send versus receive data.

Features may be aggregated into profiles based on session data. Each network session may comprise metadata that is collected during a collection phase. Once the metadata is in a database, such as session database 108, it may be analyzed to aggregate individual network sessions into meta-sessions.

In some embodiments, a given meta-session may be associated with a time window, such as a half hour. The given meta-session may group all activity between a designated set of two or more client devices (e.g., all activity or network sessions between two IP addresses) over a half hour time period into the given meta-session. The meta-session may characterize, for example, a number of network sessions between the designated set of two or more client devices in the half-hour time window. In some embodiments, a network session may include a communication between a set of two or more client devices which lasts a designated period of time (e.g., 30 seconds). Every 30 seconds wherein the set of two or more client devices communicate in the half-hour time window may be counted as an individual network session.

In the discussion below, it is assumed that each meta-session represent entities (e.g., client devices) which exhibit multiple sessions over time with a same IP pair connecting in a same protocol. For example, if two IP pairs are communicating periodically via some port, session data and thus features identified by analyzing the session data will increase for that meta-session and profile data will be richer. Once enough data is collected for an IP pair over some time period, the meta-session may be input to a machine learning model or other classifier to estimate a level of maliciousness of the meta-session.

Figure 3:
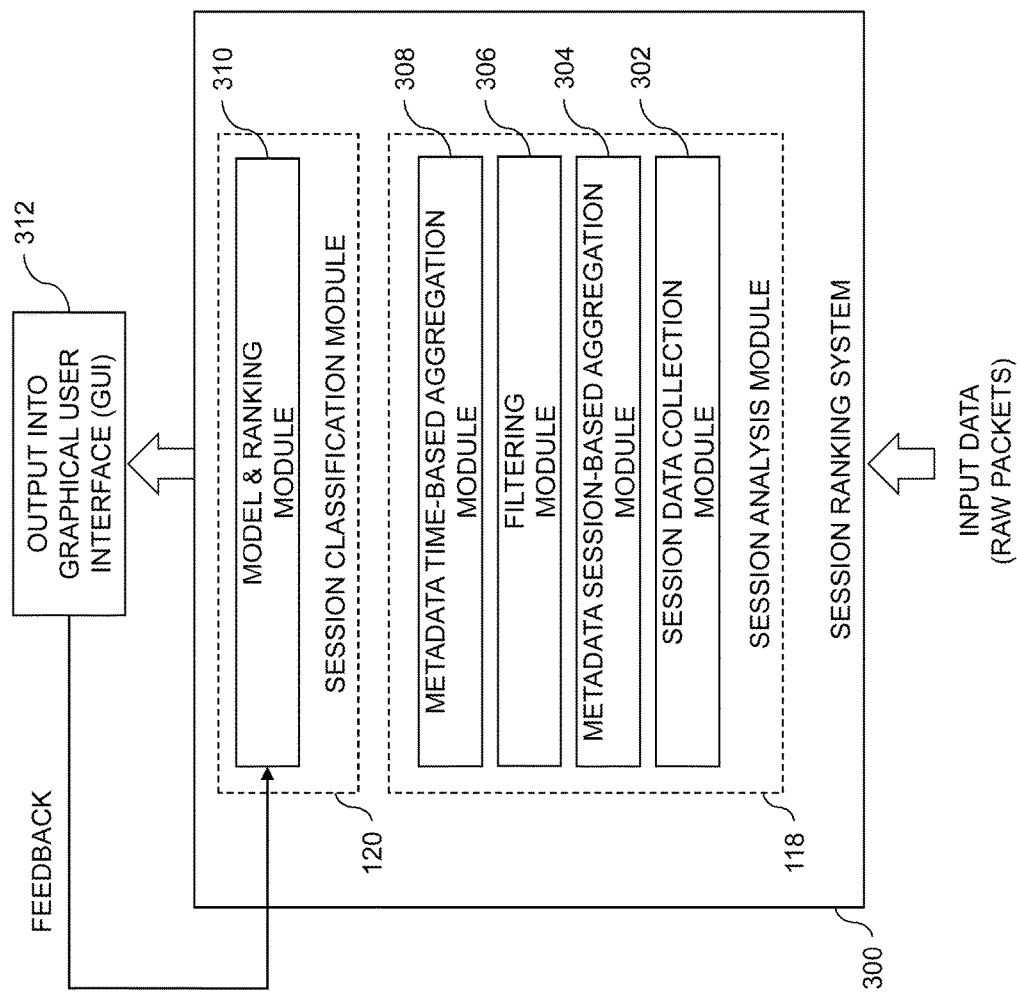
FIG. 3 is a block diagram of a session ranking system in an illustrative embodiment.

FIG. 3 shows a session ranking system 300, illustrating processing and continuous learning. The session ranking system 300 include session data collection module 302, metadata session-based aggregation module 304, filtering module 306 and metadata time-based aggregation module 308, which collectively implement functionality similar to that of the session analysis module 118 (shown in FIG. 3 in dashed outline surrounding these modules). The session ranking system 300 further includes a model and ranking module 310 which implements functionality similar to that of the session classification module 120 (shown in FIG. 3 in dashed outline surrounding this module).

The session data collection module 302 is configured to perform data collection, for historic reasons and analytics. The session ranking system 300 receives input data, which may be in the form of raw packets that are provided to the session data collection module 302. The session data collection module 302 collects metadata and some raw features from the input data.

The metadata session-based aggregation module 304 is configured to perform parsing of the metadata collected by the session data collection module 302. The metadata session-based aggregation module 304 is further configured to do some aggregation, on the session level, enabling the creation of intelligent features used in additional modules such as the filtering module 306.

The session ranking system 300 is configured to continuously learn from labeled data by getting feedback from the users using the session ranking system 300. In some cases, it is known in advance that certain services or protocols are more vulnerable than others. For example, the HTTP service (port 80) is one of the most commonly exploited services for malicious attacks. Such vulnerable services or protocols may be so labeled.

The filtering module 306 is configured to filter the sessions by service, such that the most commonly exploited services are provided to the metadata time-based aggregation module 308. The most commonly exploited services may be defined by the user, learned through previous analysis and classification of network sessions, obtained from a database such as session database 108, etc. Various thresholds may be used to provide cutoffs for defining the most commonly exploited services filtered by the filtering module 306. For example, the filtering module 306 may provide all services which have a specified threshold level of exploitation (or some specified number of services with the highest levels of exploitation) to the metadata time-based aggregation module 308.

The model and ranking module 310, as will be discussed in further detail below, may look for repeating or beaconing behavior. As a result, sessions may be aggregated into meta-sessions using time frames or windows utilizing the metadata time-based aggregation module 308. The metadata time-based aggregation module 308, in some embodiments, takes network sessions executed by a same IP pair during some time frame or time window and aggregates them into a meta-session. The model and ranking module 310 performs classification and ranking of each meta-session, returning a sorted or ordered list of the meta-sessions according to some designated characteristic (e.g., risk of maliciousness). This ordered list may be provided as output 312 for additional processing by analysts, such as output into a graphical user interface (GUI) accessible to one or more analysts.

Figure 4:
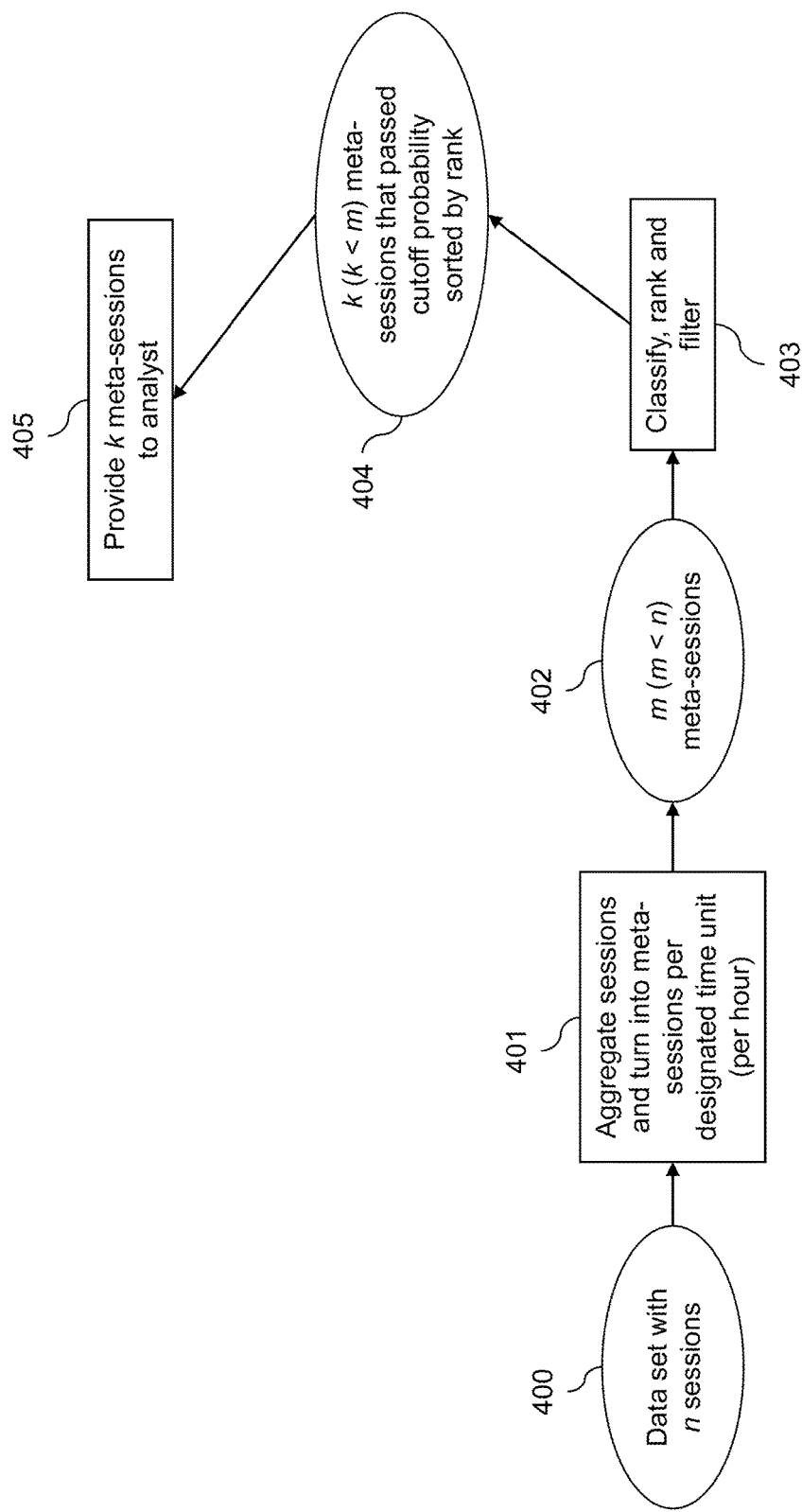
FIG. 4 is block diagram showing a processing flow for classifying network sessions in an illustrative embodiment.

Session data is preprocessed, and the session data for a plurality of network sessions is aggregated into meta-sessions as discussed above. FIG. 4 shows a processing flow of session data in the session ranking system 300. A data set is provided in block 400 with n network sessions (e.g., the input data of FIG. 3). The n network sessions are aggregated in step 401 and turned into meta-sessions per designated time unit (e.g., per hour). In block 402, a number m of meta-sessions, where m<n, are provided for ranking. The m meta-sessions are classified, ranked and filtered in step 403. In block 404, a number k of the meta-sessions that pass a cutoff probability of being malicious, where k<m, are provided. The k meta-sessions are sorted by their rank, or their likelihood or risk of maliciousness. In some embodiments, this involves classification of the meta-sessions and assignment of a risk score for each meta-session in some designated range (e.g., from 0 to 1, where 0 is benign or no risk and 1 is malicious or poses a highest risk). In step 405, the k meta-sessions are provided for additional processing by one or more analysts.

The number k of the ranked meta-sessions provided for further processing in step 405 may be determined based on various factors, such as the average amount of time it would take an analyst to handle a given meta-session (e.g., to determine whether network sessions aggregated in the given meta-session are in fact malicious). In some embodiments, the additional processing by analysts is tracked over time, to understand how many incidents, network sessions or meta-sessions an analyst can work on and handle. The number k may be limited such that the workload of an analyst is feasible. For an analyst implemented as a third-party service, the number k may be selected based on a monetary cost per meta-session. For an analyst implemented as an expert human, the number k may be based on that expert's previous performance and average time to solve a ticket (e.g., an average time to determine whether a meta-session is in fact malicious). The number k may be adjusted over time as resources change. More generally, the number k may be based on an amount of resources (human, computing or otherwise) that are available for performing additional processing to determine whether a designated number of ranked meta-sessions are potentially malicious.

Equations (1)-(3) described below illustrate a scoring function which may be used to decide upon the risk of meta-sessions. Equation (1) shows an exponential decay parameter which gives an importance of a meta-session based on its position within an ordered list of meta-sessions:

$$\text{decay}_{vec} = e^{-\lambda v} \quad (1)$$

where $\text{decay}_{vec}$ is the exponential decay vector, $\lambda$ is the exponential decay parameter, and v represents the position of a given meta-session in an ordered list of meta-sessions. Equation (1) ensures that meta-sessions at the top of the ordered list are assigned higher importance then sessions that fall at the bottom of the list, with a large drop-off in assigned importance after a cutoff position determined by the exponential decay parameter $\lambda$.

Equation (2) depicts an average precision at a position k in the ordered list:

$$P(k) = \frac{TP_k}{k} \quad (2)$$

where $TP_k$ denotes the number of true positives encountered up to the kth item in the ordered list.

Equation (3) provides a final score for an algorithm used for classification of meta-sessions:

$$\text{score} = \sum_{k=1}^{n} \text{decay}_{vec}(k) * P(k). \quad (3)$$

The higher the score of the algorithm or classifier, the better that classifier is at presenting more relevant results (e.g., meta-sessions likely to be malicious) at the top of the ordered list of meta-sessions. As can be seen, the scoring function of Equation (3) combines exponential decay and average precision parameters.

FIG. 5 shows an example 500 of classifier ranking using the scoring function of equation (3). In the example 500, there are two classifiers R1 and R2 with result vectors r1 and r2, respectively, for ranking 5 meta-sessions. The results of R1 and R2 are shown, along with their true labels (e.g., benign meta-sessions have a true label of 0 while potentially malicious meta-sessions have a true label of 1). After sorting the result vectors r1 and r2 by score and their respective labels, performance differences are seen. Adding the exponential decay component to the scores, it is seen that classifier R1 is better at ranking the meta-sessions (e.g., at placing meta-sessions that are potentially malicious at the top of an ordered list). Although both precision and recall are the same for classifiers R1 and R2, the scoring function assigns R1 a higher score based on its superior ability to rank more accurately at the top of the list.

To examine results, a test set with two services (e.g., an HTTP service and an unknown service) split into benign sessions and malicious sessions was provided. The good or benign sessions are non-malicious sessions used by legitimate services in an enterprise, while the bad or malicious sessions are used by malware such as Command and Control (C2) or Trojan viruses. The test data included 77,000 malicious sessions and 61,000 benign sessions of the unknown service.

Figure 6:
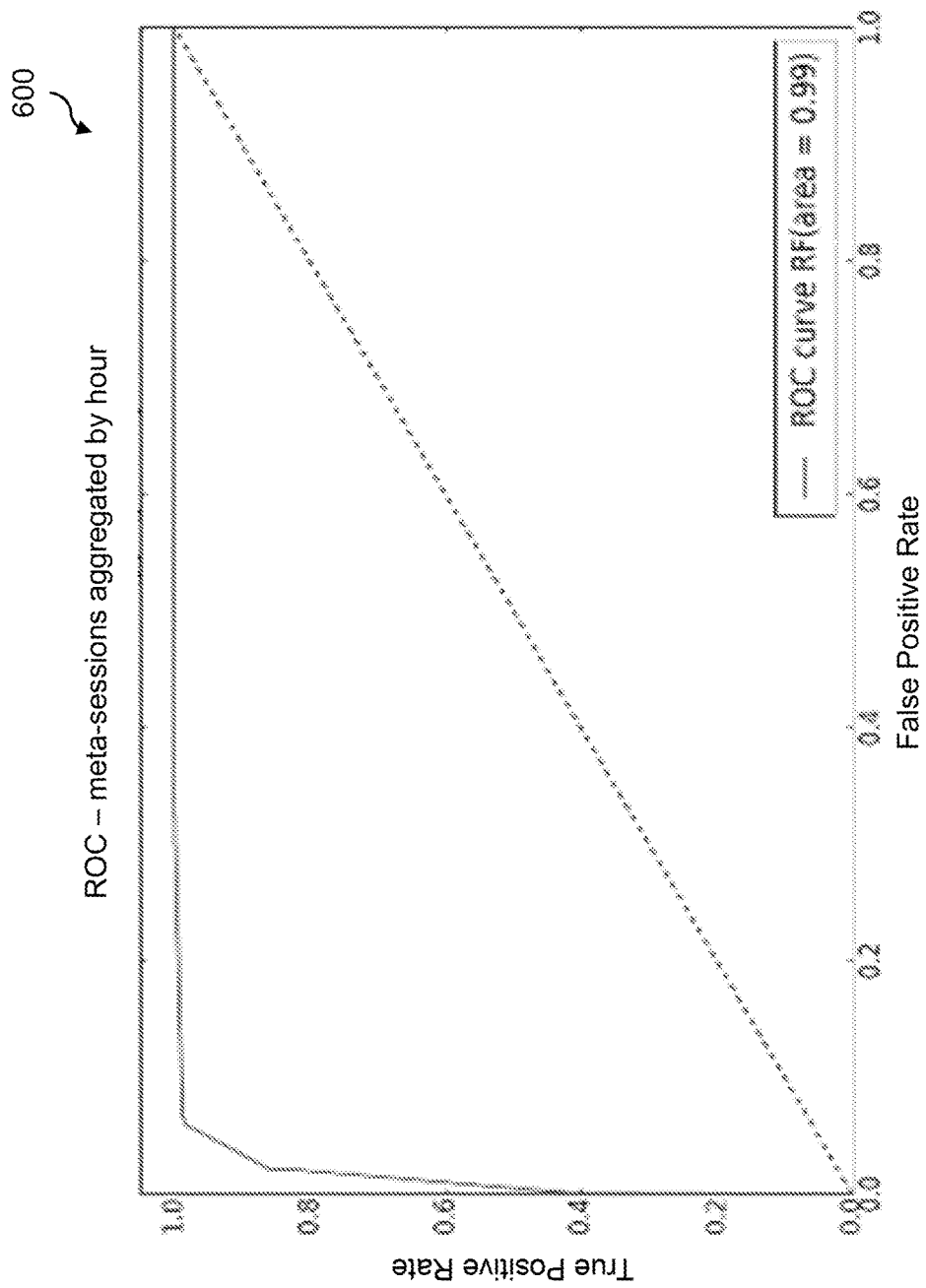
FIG. 6 is a receiver operating characteristic curve for a session ranking model in an illustrative embodiment.
Figure 7:
FIG. 7 is a table showing ranking measurements of a data set in an illustrative embodiment.

Evaluation of results is split into two sections. First, an example classifier is evaluated using a standard receiver operating characteristic (ROC) curve to obtain an understanding of how accurate the model is. FIG. 6 shows ROC curve 600, representing meta-sessions aggregated by hour, with the axes representing the true positive rate and the false positive rate. Second, it is determined how well the model performed in ranking meta-sessions as described above. Ranking performance is evaluated by taking a test set with 52,000 meta-sessions, of which 41,000 were benign and 11,000 were malicious. FIG. 7 shows a table 700 illustrative evaluation of the precision for the first k meta-sessions ranked by score. The example classifier used with the test data shows a good ability to classify top k results with high precision, which slowly degrades as the list of meta-sessions grows in size. The Equations (1)-(3) described above may be used to evaluate several different classifiers or algorithms and to select one of the available classifiers for use in ranking the meta-sessions.

Embodiments provide a number of advantages relative to conventional techniques for network session ranking. A unique ranking model is provided to rank the algorithms or classifiers performing classification, in order to make sure that the number of sessions an analyst can handle is represented. By using exponential decay combined with average precision, the problem of the amount of work each analyst can handle is addressed, considering the precision of the results at the top of an ordered list as opposed to an entire dataset.

Further, some embodiments provide for aggregation of network sessions into meta-sessions that are grouped by time period. This allows the model to identify activity more accurately than models which consider or are based on features from single, independent sessions. Moreover, models used in some embodiments combine use of various types of features including raw IOCs, service analysis features, and session features. Each feature type provides its own advantages. Session features indicate if, on the meta-session level, there is anomalous activity. Service analysis features indicate if there is anomalous activity on the network service protocol activity. Raw IOC features on the server and client level indicate if a communication between two parties is of high risk. By combining these different types of features, models used in some embodiments exhibit increased predictive accuracy thereby enabling better risk assessment.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security systems, modules, session data features, scoring functions, remedial actions for modifying access to network sessions, etc. can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
obtaining session data related to a plurality of network sessions, a given one of the plurality of network sessions being associated with a set of two or more of a plurality of client devices;
analyzing the session data to identify one or more features of respective ones of the plurality of network sessions;
utilizing the one or more features to aggregate the plurality of network sessions into a plurality of meta-sessions, a given one of the meta-sessions comprising a set of two or more of the plurality of network sessions having features exhibiting at least a threshold level of similarity;
selecting a classifier for ranking the meta-sessions based on a scoring function that characterizes performance of the selected classifier in ranking meta-sessions having at least one designated characteristic;
ranking the meta-sessions utilizing the selected classifier;
providing a designated number of the ranked meta-sessions for additional processing to determine whether respective ones of the meta-sessions in the designated number of the ranked meta-sessions are potentially malicious; and
modifying access by the plurality of client devices to an additional network session responsive to the additional network session comprising session data with one or more features exhibiting at least the threshold level of similarity to one of the meta-sessions in the designated number of the ranked meta-sessions determined to be potentially malicious;
wherein the method is performed by at least one processing device comprising a processor coupled to a memory.

2. The method of claim 1 wherein the processing device comprises a network security system configured to communicate with the plurality of client devices over at least one network.

3. The method of claim 1 wherein the one or more features comprise indicators of compromise, the indicators of compromise comprising at least one of:
malware signatures; and
Internet Protocol (IP) addresses and IP domains associated with known potentially malicious network sessions.

4. The method of claim 1 wherein the one or more features comprise technical indicators associated with network protocols of respective ones of the plurality of network sessions, the technical indicators comprising at least one of:
a direct communication with an Internet Protocol (IP) address rather than an IP domain in a host header;
a hypertext transfer protocol (HTTP) POST request without a referrer header; and
an HTTP POST request in a given network session that does not utilize one or more other HTTP requests.

5. The method of claim 1 wherein the one or more features comprise session analysis features, the session analysis features comprising at least one of:
a connection originated from a first one of the plurality of client devices within a designated portion of a network to a second one of the plurality of client devices outside the designated portion of the network;
a connection originated from the second client device outside the designated portion of the network to the first client device within the designated portion of the network;
an entropy for payload streams of a given network session; and
a ratio of send versus receive data for the given network session.

6. The method of claim 1 wherein the given meta-session comprises two or more network sessions utilizing a same session protocol between a first one of the plurality of client devices and a second one of the plurality of client devices over a designated time period.

7. The method of claim 1 wherein ranking the meta-sessions comprises generating a list of the meta-sessions ordered based on risk of potential maliciousness.

8. The method of claim 7 wherein the scoring function characterizes the performance of the selected classifier in ranking meta-sessions that are potentially malicious at a top of the ordered list of the meta-sessions.

9. The method of claim 1 wherein the scoring function utilizes an exponential decay parameter, the exponential decay parameter assigning importance to the meta-sessions based on respective positions of the meta-sessions in an ordered list of the meta-sessions.

10. The method of claim 9 wherein the exponential decay parameter gives higher weight to a first x meta-sessions in the ordered list of the meta-sessions and exponentially lower weights to meta-sessions after the first x meta-sessions in the ordered list of the meta-sessions.

11. The method of claim 1 wherein the scoring function utilizes a precision parameter, the precision parameter characterizing an average precision at a designated position in an ordered list of the meta-sessions.

12. The method of claim 11 wherein the designated position is selected based on resources available for determining whether respective ones of the meta-sessions in the designated number of the ranked meta-sessions are potentially malicious.

13. The method of claim 12 wherein the designated position is adjusted over time as the resources available for determining whether respective ones of the meta-sessions in the designated number of the ranked meta-sessions are potentially malicious change.

14. The method of claim 1 wherein modifying access by the plurality of client devices to the additional network session comprises at least one of:
 terminating the additional network session;
 preventing a given one of the plurality of client devices from joining the additional network session;
 causing the given client device to join the additional network session in a sandboxed application environment on the given client device.

15. A computer program product comprising a non-transitory processor-readable storage medium having stored therein program code of one or more software programs, wherein the program code when executed by at least one processing device cause the at least one processing device:
 to obtain session data related to a plurality of network sessions, a given one of the plurality of network sessions being associated with a set of two or more of a plurality of client devices;
 to analyze the session data to identify one or more features of respective ones of the plurality of network sessions;
 to utilize the one or more features to aggregate the plurality of network sessions into a plurality of meta-sessions, a given one of the meta-sessions comprising a set of two or more of the plurality of network sessions having features exhibiting at least a threshold level of similarity;
 to select a classifier for ranking the meta-sessions based on a scoring function that characterizes performance of the selected classifier in ranking meta-sessions having at least one designated characteristic;
 to rank the meta-sessions utilizing the selected classifier;
 to provide a designated number of the ranked meta-sessions for additional processing to determine whether respective ones of the meta-sessions in the designated number of the ranked meta-sessions are potentially malicious; and
 to modify access by the plurality of client devices to an additional network session responsive to the additional network session comprising session data with one or more features exhibiting at least the threshold level of similarity to one of the meta-sessions in the designated number of the ranked meta-sessions determined to be potentially malicious.

16. The computer program product of claim 15 wherein the scoring function utilizes an exponential decay parameter, the exponential decay parameter assigning importance to the meta-sessions based on respective positions of the meta-sessions in an ordered list of the meta-sessions.

17. The computer program product of claim 15 wherein the scoring function utilizes a precision parameter, the precision parameter characterizing an average precision at a designated position in an ordered list of the meta-sessions, the designated position being selected based on resources available for determining whether respective ones of the meta-sessions in the designated number of the ranked meta-sessions are potentially malicious.

18. An apparatus comprising:
 at least one processing device comprising a processor coupled to a memory;
 the at least one processing device being configured:
  to obtain session data related to a plurality of network sessions, a given one of the plurality of network sessions being associated with a set of two or more of a plurality of client devices;
  to analyze the session data to identify one or more features of respective ones of the plurality of network sessions;
  to utilize the one or more features to aggregate the plurality of network sessions into a plurality of meta-sessions, a given one of the meta-sessions comprising a set of two or more of the plurality of network sessions having features exhibiting at least a threshold level of similarity;
 to select a classifier for ranking the meta-sessions based on a scoring function that characterizes performance of the selected classifier in ranking meta-sessions having at least one designated characteristic;
 to rank the meta-sessions utilizing the selected classifier;
 to provide a designated number of the ranked meta-sessions for additional processing to determine whether respective ones of the meta-sessions in the designated number of the ranked meta-sessions are potentially malicious; and
 to modify access by the plurality of client devices to an additional network session responsive to the additional network session comprising session data with one or more features exhibiting at least the threshold level of similarity to one of the meta-sessions in the designated number of the ranked meta-sessions determined to be potentially malicious.

19. The apparatus of claim 18 wherein the scoring function utilizes an exponential decay parameter, the exponential decay parameter assigning importance to the meta-sessions based on respective positions of the meta-sessions in an ordered list of the meta-sessions.

20. The apparatus of claim 18 wherein the scoring function utilizes a precision parameter, the precision parameter characterizing an average precision at a designated position in an ordered list of the meta-sessions, the designated position being selected based on resources available for determining whether respective ones of the meta-sessions in the designated number of the ranked meta-sessions are potentially malicious.

* * * * *